United States Patent
Zaidi et al.

(10) Patent No.: US 7,124,376 B2
(45) Date of Patent: Oct. 17, 2006

(54) DESIGN TOOL FOR SYSTEMS-ON-A-CHIP

(75) Inventors: S. Jauher A. Zaidi, San Jose, CA (US); Michael Ou, Newark, CA (US); Lyle E. Adams, San Jose, CA (US); Stephen Chappell, Cupertino, CA (US); Savitha Gandikota, Sunnyvale, CA (US); Jon Udell, Fort Collins, CO (US); Brian Gutcher, Loveland, CO (US); Jef Munsil, Fort Collins, CO (US)

(73) Assignee: Palmchip Corporation, Santa Clara, CA (US)

( * ) Notice: Subject to any disclaimer, the term of this patent is extended or adjusted under 35 U.S.C. 154(b) by 298 days.

(21) Appl. No.: 09/954,122

(22) Filed: Sep. 17, 2001

(65) Prior Publication Data

US 2002/0038401 A1   Mar. 28, 2002

Related U.S. Application Data

(63) Continuation-in-part of application No. 09/565,282, filed on May 2, 2000, now Pat. No. 6,601,126.

(60) Provisional application No. 60/302,864, filed on Jul. 5, 2001, provisional application No. 60/303,221, filed on Jul. 5, 2001.

(51) Int. Cl.
   *G06F 17/50* (2006.01)
(52) U.S. Cl. .......................................................... 716/1
(58) Field of Classification Search .................. 716/1–5
   See application file for complete search history.

(56) References Cited

U.S. PATENT DOCUMENTS 5,870,310 A * 2/1999 Malladi ....................... 716/19
5,898,846 A * 4/1999 Kelly .......................... 710/104
6,102,961 A * 8/2000 Lee et al. ....................... 716/1
6,377,581 B1 * 4/2002 Anand et al. ................ 370/402
6,425,109 B1 * 7/2002 Choukalos et al. ............. 716/1
6,427,224 B1 * 7/2002 Devins et al. .................. 716/4
6,446,243 B1 * 9/2002 Huang et al. ................... 716/7
6,477,691 B1 * 11/2002 Bergamashi et al. .......... 716/12
6,523,082 B1 * 2/2003 Yoshida ....................... 710/313
6,578,174 B1 * 6/2003 Zizzo ............................. 716/1
6,618,839 B1 * 9/2003 Beardslee et al. ............. 716/4
6,678,645 B1 * 1/2004 Rajsuman et al. ............ 703/20
6,718,411 B1 * 4/2004 Creedon et al. ............ 710/100
2002/0162043 A1 * 10/2002 Messmer et al. ........... 713/500
2003/0101331 A1 * 5/2003 Boylan et al. ................ 712/36
2003/0154465 A1 * 8/2003 Bollano et al. ............. 717/137

* cited by examiner

*Primary Examiner*—Thuan Do
*Assistant Examiner*—Magid Y. Dimyan
(74) *Attorney, Agent, or Firm*—Matthew J. Booth & Associates PLLC; Matthew J. Booth

(57) ABSTRACT

A pre-designed system-on-chip architecture and method includes several standard library devices, HDL source code, simulation environment and regression, synthesis scripts, software header files, software libraries, ASIC verification test suites, and makefiles. The standard library devices comprise an integrated CPU, a shared memory controller, a peripheral controller, system peripherals, a DMA controller, embedded memory, and general system control. CPU bridges are used to accommodate a variety of processor types and to insulate users from the complexities of interfacing to different kinds of processors. Such CPU bridges further allow the latest processors to be rapidly integrated into existing integration platforms and designs.

16 Claims, 5 Drawing Sheets

DESIGN TOOL FOR SYSTEMS-ON-A-CHIP

COPENDING APPLICATION

This patent application is a continuation-in-part of U.S. patent application Ser. No. 09/565,282, filed May 2, 2000, and titled CHIP-CORE FRAMEWORK FOR SYSTEMS-ON-A-CHIP, by S. Jauher A. ZAIDI, et al.

BACKGROUND OF THE INVENTION

1. Field of the Invention

The present invention relates generally to semiconductor integrated circuit design and devices, and more specifically to pre-designed system-on-chip architectures with HDL source code, simulation environment and regression, synthesis scripts, software header files, software libraries, ASIC verification test suite, and makefiles.

2. Description of the Prior Art

As systems-on-chip (SoC) become more complex, it will be increasingly difficult for a single company to provide its customers with all of the semiconductor intellectual property (SIP) cores and library macrocells they require. Companies have to evaluate whether human resources, capital and time are expendable on extraneous developments. A growing trend is to outsource the areas that fall outside of their core competencies.

Time-to-market is the dominant factor directing this make vs. buy decision. SoC's are reaching higher levels of integration, but their complexity is inversely proportional to the allowable time-to-market. "Buying" semiconductor intellectual property will become essential for surviving in an environment that demands increased profits and decreased time-to-market. For companies to meet the technology challenges of integrating externally developed semiconductor intellectual property into a single chip, within the given time window, they may decide to partner with others, including, in some cases, their competitors.

Outsourcing and partnership will be the essential elements of a successful semiconductor business in the next century because those capabilities will help companies deliver what customers want. Companies using SoC technologies have recognized the need to license or buy semiconductor intellectual property from other companies. But just purchasing the semiconductor intellectual property is not enough. Integrating semiconductor intellectual property in a system-on-chip is complicated, especially when components from multiple sources are involved. Semiconductor intellectual property integrators and providers need to actively work together to make sure that all of the pieces of the SoC fit seamlessly. One way to leverage the strength of a partnership is by offering an open on-chip architecture.

Successful semiconductor companies must be able to deliver to the customer an on-chip architecture, in which components can be dropped in and interconnected with little difficulty. Open means that it is supported by third-party companies, thereby producing a collaborative effort to reduce the design-integration struggles found in SoC development, including hardware and software co-design and co-verification. That also results in reducing time-to-market. Customers may include choices in how they build their SoC devices, which semiconductor intellectual property components to integrate, and what software and operating system to implement. Outsourcing and partnership are keys to successfully offering customers what they want. Taking this a step further, providing and/or supporting an open architecture gives customers the flexibility they need.

The electronics industry has been driven by the need to increase performance, reduce costs and enhance features. Many of these needs have been met through the use of newer, faster and cheaper technologies. Newer technologies continue to allow for more functions and features to be placed on a single piece of silicon. Functions that previously were placed on separate chips can now be integrated in a system-on-chip with new functions added.

In any processor-driven embodiment, a number of peripheral devices are needed. These include timers, DMA engines, interrupt controllers and memory controllers. In many cost-sensitive applications, a shared memory structure is preferably used to reduce memory component costs. An architecture is needed which addresses the memory needs of all devices without severely degrading the performance of any single device.

The PCIbus, ISA, VMEbus, and most other buses were designed as system level buses to connect discrete devices on a printed circuit board (PCB) substrate. At the board level, a key issue is minimizing the number of bus signals because pin and signal count translate directly into package and PCB costs. A large number of device pins increases the package footprint and reduces component density on the board. System level buses must support add-in cards and PCB backplanes where connector size and cost are also directly related to signal count. This is why traditional system level buses use shared tri-state signaling and, in the case of PCIbus, multiplexed address and data on the same signals. Timing problems can be investigated in the laboratory using prototype PCBs that can then be modified and re-spun in a few days.

In the on-chip world, signal routing consumes silicon area but does not greatly affect the size or cost of packages, PCBs and connectors. The limited capabilities of today's logic synthesis tools directly impact embodiment time and performance and must be taken into account. Getting the lowest possible routing overhead is of little value if the system design time balloons way out of proportion and the market window is missed. Synthesis tools find it difficult to deal with shared tri-state signals with several drivers and receivers connected to the same trace. Static timing analysis is preferably awkward, and often the only way to verify timing is to use a circuit level simulator, e.g., SPICE. All of this takes time and effort without adding real value in terms of device functionality or features. Bus loading also limits theoretical performance and the verification problems associated with bus loading can lead to a conservative embodiment whose performance falls short of the inherent technology capabilities.

SUMMARY OF THE PRESENT INVENTION

It is therefore an object of the present invention to provide a pre-designed system-on-chip architecture with HDL source code, simulation environment and regression, synthesis scripts, software header files, software libraries, ASIC verification test suites, and makefiles.

It is a further object of the present invention to provide an on-chip interconnect architecture that standardizes how systems-on-chip are fabricated on silicon semiconductor integrated circuit chips.

Briefly, a pre-designed system-on-chip architecture and method embodiment of the present invention includes several standard library devices, HDL source code, simulation environment and regression, synthesis scripts, software header files, software libraries, ASIC verification test suites, and makefiles. The standard library devices comprise an integrated CPU, a shared memory controller, a peripheral controller, system peripherals, a DMA controller, embedded memory, and general system control.

An advantage of the present invention is that a system is provided that enables electronics applications to be developed quickly and to be portable between silicon foundries.

Another advantage of the present invention is that a pre-designed system-on-chip architecture and method are provided that reduce a user's time-to-market with new products.

These and other objects and advantages of the present invention will no doubt become obvious to those of ordinary skill in the art after having read the following detailed description of the preferred embodiment which is illustrated in the drawings.

IN THE DRAWINGS

DETAILED DESCRIPTION OF THE PREFERRED EMBODIMENTS

Figure 1:
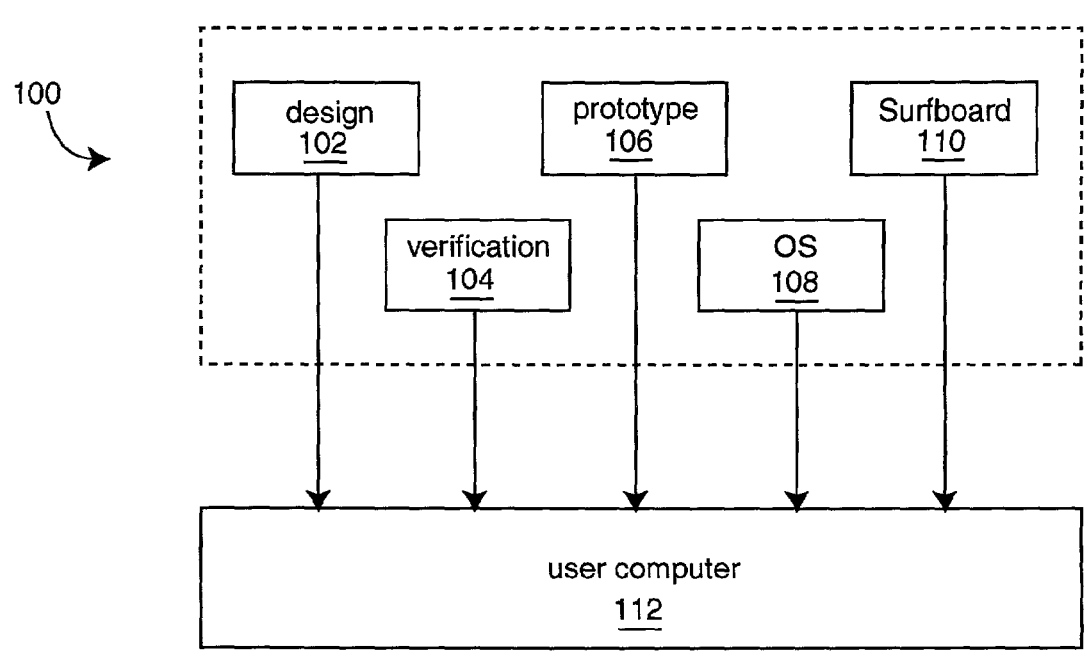
FIG. 1 is a functional block diagram of system-on-chip (SoC) design platform embodiment of the present invention for system-on-chip integration.

FIG. 1 illustrates a system-on-chip (SoC) design platform embodiment of the present invention for system-on-chip integration, and is referred to by the general reference numeral 100. The SoC design platform 100 is delivered to a user that include design 102, verification 104, prototype 106, operating system (OS) 108, and Palmchip Corporation (San Jose, Calif.) Surfboard 110.

The design, verification, prototype, and operating system deliverables 100, 102, 104, 106, and 108, are embodied as electronic data and may be delivered as computer data files. Such computer-data files are carried on removable disk or downloaded over the Internet for a subscription or usage fee. For example, an Internet-based SIP sales and delivery system is the so-called Virtual Component Exchange (VCX), see www.vcx.org. The SoC design platform 100 enables users to co-develop target hardware and software that integrates standard SIP-blocks with their own value-added SIP-blocks.

The basic SoC building blocks, internal bus protocols, and architecture of the user product are described in detail in the parent application, U.S. patent application Ser. No. 09/565, 282, filed May 2, 2000, and titled CHIP-CORE FRAMEWORK FOR SYSTEMS-ON-A-CHIP, by S. Jauher A. ZAIDI, et al. Such is incorporated herein by reference.

The design deliverable 102 includes hardware description language (HDL) source code for a complete design, synthesis scripts for Synopsys design compiler, documentation, installation guide, product users guide, CoreFrame users guide, and application notes on how to plug in custom blocks using CoreFrame signal protocols.

The verification deliverable 104 includes: integrated hardware/software co-verification testbench environment, simulation models for memories, LCD, oscillator and i/o cells; C-source code for SoC co-verification test suite; Verilog source code bus-functional tests; hardware abstraction layer library (HAL); boot and exception handling code; makefiles; simulation utilities, including log file parser and regression scripts; documentation including installation guide, simulation environment users guide, co-verification test suite and HAL library; platform verification deliverables without a pre-integrated processor; testbench environment for use with bus-functional tests; simulation utilities, including regression scripts; installation guide; and simulation environment users guide.

The prototype deliverable 106 includes a pre-programmed Surfboard (Palmchip Corporation, San Jose, Calif.), Altera netlist programming file, HAL library, boot and exception handling code, ASIC verification test suite code, board diagnostics, and documentation.

The OS deliverable 108 includes an OS board support package, processor-specific boot code, exception handling code, makefiles, integration of software development tools, ice-related configuration files, and an OS with all drivers for the design platform, including DMA, UART, display, timer, power management, and optimized "memcpy".

The pre-programmed Surfboard deliverable 110 includes a prototyping board with an Altera APEX programmable logic device (PLD), standard I/O interfaces, board diagnostics, documentation, and Surfboard users guide.

A typical design includes both an RTL source code implementation of the CoreFrame architecture and an entire system-on-chip design environment to accelerate user development. Users are preferably able to immediately run simulations and synthesis with the design environment. Additional semiconductor intellectual property blocks and custom logic can be quickly added-in using the built-in support for extra peripherals. Software development can also occur in parallel both in the simulation environment and with the separate Surfboard FPGA development board.

The system-on-chip hardware design environment includes a directory structure, a simulation environment and a synthesis flow. The design environment comprises Verilog RTL source code for a system-on-chip design platform, simulation testbench and tests, Synopsys synthesis scripts, and documentation.

The very top level directory of a typical hardware release is preferably named "hardware/" and includes all of the files related to the actual hardware and RTL design. A separate full software release preferably includes C-language source code and software libraries which exercise the system. Such would be named as "software/" in the same directory. Certain configurations may include a subset of a software directory with no C-language source code and only software system simulations.

The main directory files preferably exist under a "hardware/" directory. All of the submodules of the design and the top level design are listed in Table-X.

TABLE X

| Directory | Description |
| --- | --- |
| aux0/... aux9/ | location for RTL source code and related design files for auxiliary blocks 0–9 |
| bin/ | Includes executable scripts used in the simulation environment. |
| chip/ | location for RTL source code and related design files for the top level chip |
| chip_core/ | location for RTL source code and related design files for the top level chip core logic |
| cpubr/ | location for RTL source code and related design |

TABLE X-continued

Directory Description

| | |
|---|---|
| | files for the generic CPU Bridge |
| cpumem/ | location for RTL source code and related design files for the CPU Memory |
| dma/ | location for RTL source code and related design files for the DMA Controller |
| doc/ | Includes documentation for a hardware release. |
| intctl/ | location for RTL source code and related design files for the Interrupt Controller |
| lcd/ | location for RTL source code and related design files for the Character LCD Controller |
| lib/ | Includes library components for the directory. |
| mc/ | location for RTL source code and related design files for the Memory Controller |
| palmbus/ | location for RTL source code and related design files for the PalmBus Controller |
| pio/ | location for RTL source code and related design files for the Programmable I/O block |
| sysctl/ | location for RTL source code and related design files for the main system control logic (including clocking and reset control) |
| syssim/ | System simulation directory. Such directory holds sub-directories for running system simulations. The standard sub-directory is syssim/busmodel/ which includes busmodel simulations. Other sub-directories may preferably exist for different software embodiments with different processors. |
| timer/ | location for RTL source code and related design files for the General Purpose Timer and Watchdog Timer |
| uart/ | location for RTL source code and related design files for UART450 |

Some software embodiments may have extra directories that include source code for add-on features, e.g., processor specific interface logic, and additional "syssim/" simulation directories for testing with specific processor software.

Most of the block design directories containing RTL source code have a separate subdirectory structure underneath, e.g., "cpubr/", "cpumem/", "dma/", "intctl/", "lcd/", "mc/", "palmbus/", "pio/", "sysctl/", "timer/", and "uart/". The "<block>/sim/" subdirectory includes the simulation tests for the design. The "<block>/synop/" subdirectory includes the Synopsys synthesis scripts and output files for the design. The "<block>/vlog/" subdirectory includes the Verilog RTL source code for the design; if the embodiment language were VHDL, the "<block>/vhdl/" subdirectory includes the VHDL RTL source code for the design.

All of these submodules are referenced in the top level chip, which has a similar structure. The "chip/sim/" directory includes a top level simulation environment. The "chip/synop/" directory includes top level synthesis scripts and files. The "chip/vlog/" or "chip/vhdl/" directory includes a top level chip RTL source code.

The simulation environment preferably has a "lib/" directory which includes general RTL library components used throughout the environment. Such has sub-directories, "lib/models/" that includes behavioral models written in unsynthesizable HDL code and are referenced by the top level simulation environment, and "lib/vlog/" or "lib/vhdl" which includes RTL source code for commonly used design components. These modules are written in synthesizable Verilog or VHDL and are referenced by the various block design embodiments.

A preferred simulation environment facilitates block level design and system level verification. A single system-level testbench is used which links an entire design together to simulate any blocks that interact with the main system buses or each other. The directory structure uses a symmetrical and relatively flat hierarchy. Thus, navigating through the directory structure and adding new blocks into the design are preferably made very easy.

Each design block has its own separate simulation directory, defined as "<block>/sim/" in the directory structure. Such directory includes all of the tests exercising that given block in the system. Simulations for the block can be run directly from this directory. Additional tests for the block can be placed into this directory and simulated. New blocks can be easily added into the same environment by adding the same directory structure consisting of the "<newblock>/vlog/" or "<newblock>/vhdl/", and "<newblock>/sim/" directories. Tests exercising this new block in the system would be placed in the "<newblock>/sim/" directory and executed from that directory.

Simulations are also run from the main system simulation directory called "syssim/". Such directory includes different sub-directories to run system simulations from, including bus model tests as well as firmware simulations. The "syssim/busmodel/" sub-directory is the standard directory in which to start running bus model functional simulations. Such directory includes links to all of the tests located in the "<block>/sim/" directories. In addition, this directory can include any additional tests the user wishes to use.

The preferred simulation strategy for verification involves both testing on a bus functional model as well as with real firmware. A preferred embodiment includes bus functional model tests which exercise all of the modules. Embodiments with specific processors include additional firmware verification suites for further checking the design. The firmware is preferably written in "C-language" to exercise the system with the fully functional processor models. Such code is compiled to an ASCII opcode format and read into the HDL simulator and design environment. The processor simulation models then fetch in the raw opcodes and data and execute the instructions accordingly. The use of both bus functional and firmware simulations provide a high degree of confidence that the real system will be fully functional.

Actual simulations are performed using the HDL language. The simulation scripts which compile and link the design together are written specifically for certain simulators, such as Verilog-XL. However, these scripts can be modified easily to support other HDL simulators such as NC-Verilog, VCS and ModelSim.

Figure 2:
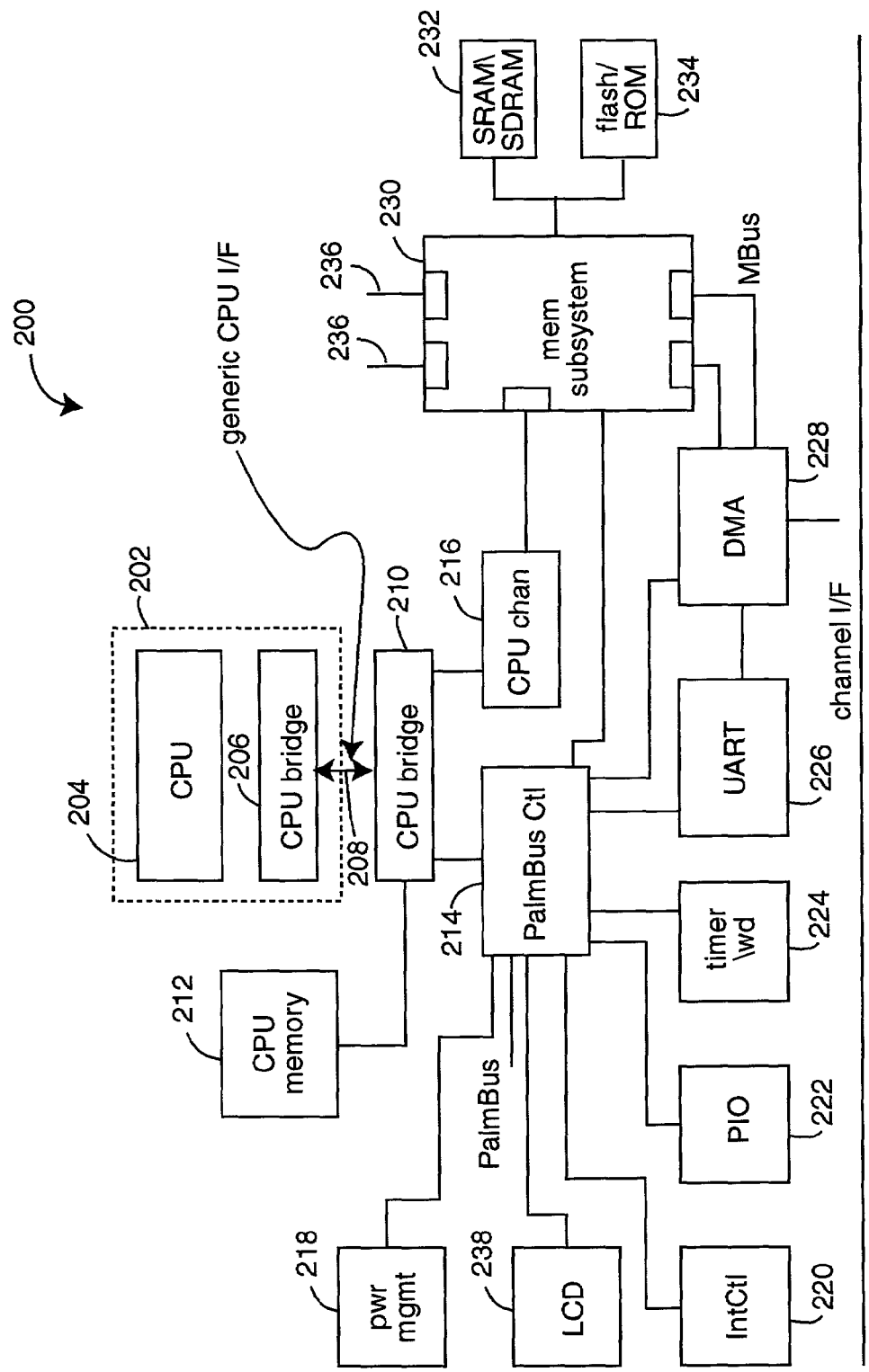
FIG. 2 is a functional block diagram of an embodiment of the present invention.

FIG. 2 represents a design platform 200 that allows a variety of central processing unit (CPU) cores 202 to be accommodated, e.g., ARM7, ARM9, etc. Prior art design platforms like Palmchip Corporation (San Jose, Calif.) PalmPak-I were fixed around the use of an industry-standard CPU only, such as the ARM7 processor. Such conventional systems presented difficulty when the user tried to use different processor cores with incompatible signals. The CPU core 202 includes a specific processor 204 and a CPU bridge 206 that converts CPU interface signals to a standardized type. The characteristic signal sets of each specific processor type therefore exist only within the core 202 and are homogenized with the other types at the CPU-bridge-to-CPU-bridge interface 208.

A corresponding CPU bridge 210 provides access to a CPU memory 212, PalmBus controller 214, and CPU channel controller 216. A standardized set of peripherals includes a power management unit 218, an interrupt controller 220, a programmable input-output controller 222, a set of timers 224, a universal asynchronous receiver transmitter (UART) 226, a direct memory access (DMA) controller 228, a character LCD controller 238, and a memory subsystem 230 connected to static random access memory (SRAM) or synchronous dynamic random access memory (SDRAM) 232 and flash memory or ROM 234.

The chip in a typical integration package is a general purpose microcontroller for use with any processor core. It features standard processor support functions as well as a 16450-compatible UART for communication to external devices. The processor interface is a simple generic interface which can connect to a multitude of processor cores with a minimal amount of glue logic. There are two levels of interrupts as well as illegal access protection. To increase performance, 8K bytes of embedded static memory are available for single-cycle fetches. To speed response to interrupts, the embedded SRAM can be mapped to flash memory space. This allows interrupt vectors to be changed without a secondary jump table, while leaving the boot vectors intact. The memory subsystem 230 provides access to external memory, DMA channels, and the auxiliary MsBus DMA ports 236. The memory subsystem 230 provides control and access for 8, 16 or 32 bits of ROM or Flash memory for boot-up. Also provided is one port for 8, 16 or 32 bits of SRAM or SDRAM. Two DMA channels 228 are provided for transmit and receive data. DMA transfer of large streams of data help free up the processor for other tasks and enhance memory efficiency. The DMA channels can also be configured back-to-back to perform memory-to-memory transfers. One general-purpose timer 224 and one watchdog timer 224 are provided. The general-purpose timer can be configured to provide time ticks at regular intervals or as a time-out counter. The processor is reset when a watchdog timeout occurs. The interrupt controller 220 allows each interrupt to be asserted as either of two interrupt levels, IRQ0 or IRQ1. This allows interrupt to be used for application-specific needs, while still fulfilling real-time requirements. Each interrupt is individually maskable; or all interrupts may be masked without altering the individual interrupt masks. The UART 226 is 16450-type, providing standard serial communication. DMA capability is added for efficient transfer of large data streams. The PIO 222 port provides integration services for the system and eliminates so-called glue logic. It provides level signals which may used to indicate system operation or to control other devices. An LCD controller block 238 can be provided to control an external 4-bit or 8-bit character LCD. The system clock is preferably derived from an external clock pin. The clock is buffered and distributed throughout the chip. A system control block also controls and distributes the reset condition to all blocks.

Figure 3:
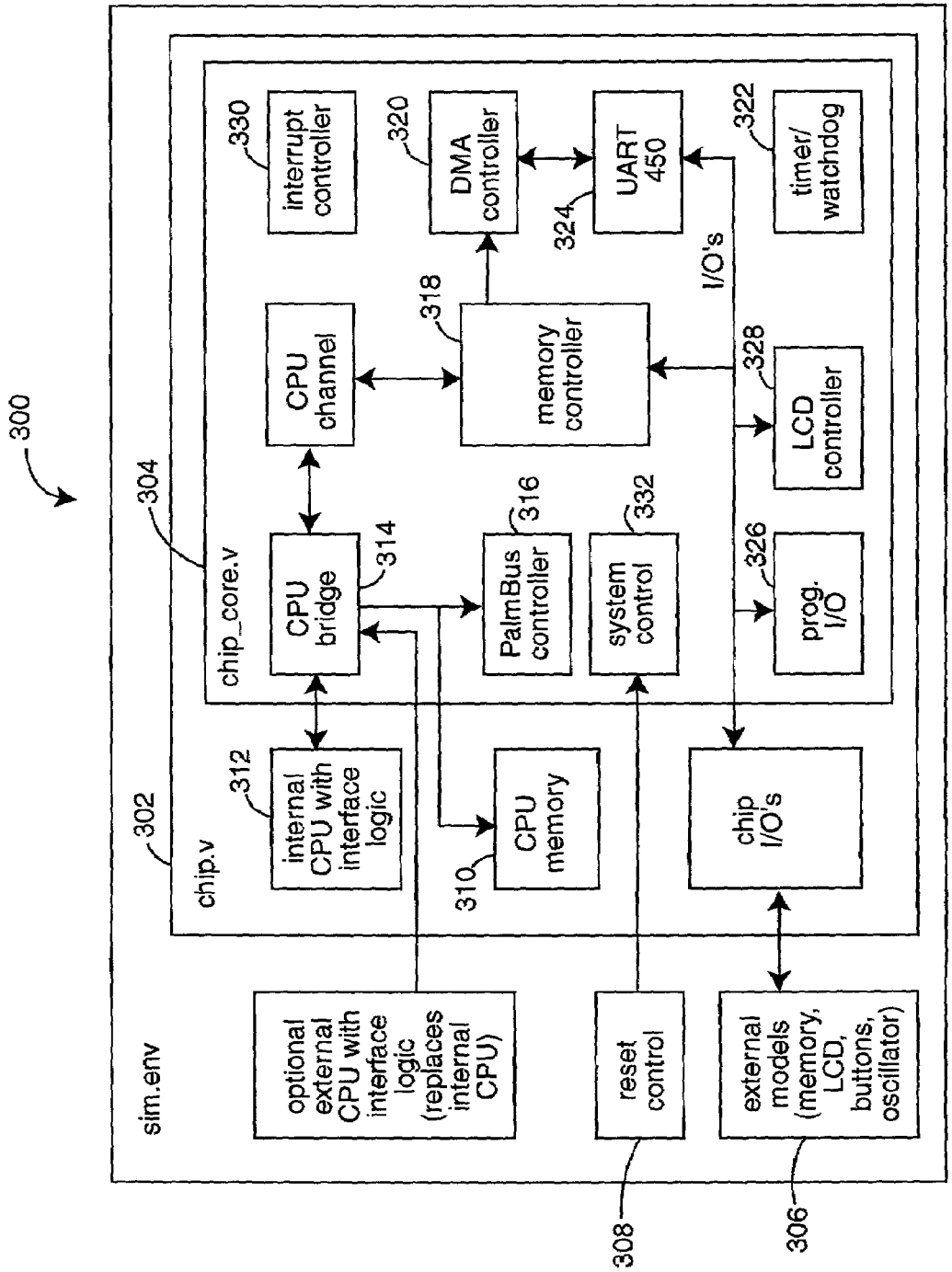
FIG. 3 is a functional block diagram of the simulation environment for an embodiment of the present invention.

FIG. 3 represents a simulation environment 300 in an embodiment of the present invention, and is modeled after how a user design might actually appear in a system, either as a single chip on a board or as a subsystem in a larger system-on-chip. The simulation environment 300 is typically embodied and delivered to a user as a computer data file. FIG. 3 illustrates the basic hierarchy of the simulation environment in which a chip 302 and chip_core 304 are components that interact with each other. In one embodiment that was constructed, a top level testbench was defined in a file "sim.env" located in a "chip/sim/" directory. Such file included several files to handle different aspects of the simulation environment. A list of the included files is given in Table-I.

TABLE I

| File | File Description |
| --- | --- |
| defs.inc | Includes the design environment parameters and general register and wire declarations for the system. |
| init.inc | Handles the initialization sequence to initialize the system. |
| libs.inc | Handles the linking and compiling of the appropriate design files for simulation. |
| sdf.inc | Controls SDF annotation for gate level simulation. |
| tasks.inc | Includes system level Verilog tasks. |

Also included in the top level "sim.env" file is a "system.mdl", e.g., a main model of the system. Such file instantiates all of the design components and models in the simulation environment. External models 306 describe any external behavioral models and are used to validate the system. These include a liquid crystal display (LCD) device model for an external device, a model for external button inputs, memory models for SRAM, SDRAM, Flash, and ROM memories, and an oscillator model for an external oscillator from which the main system clock is derived. Reset control 308 is built into the simulation environment. It handles initialization of the design and the simulation environment. The initialization flow is handled, e.g., in an "init.inc" file located in the "chip/sim/" directory.

The chip top level ("chip.v") 302 RTL file is located in the "chip/vlog/" directory and includes the chip input-outputs defined in a "chip.io" file located in the "chip/vlog/" directory. Three different design modules are preferably instantiated in the "chip.v" file 302 top level. These include a CPU memory 310, a CPU core and interface logic 312, and the main chip core logic 304. Some embodiments of the present invention will not have an internal CPU core, and may be set up for an external processor or no processor at all. In such configurations, the "chip.v" top level file 302 only includes the CPU memory block 310 and chip core logic design 304. The simulation environment preferably supports internal processor, external processor, and no processor.

The chip core logic ("chip_core.v") file 304 preferably represents the main logic constituting a system-on-chip. It instantiates a CPU bridge interface and decoder logic 314, a PalmBus Controller 316, an MBus/Memory Controller 318, a DMA Controller 320, a timers block 322, a UART450 324, a programmable I/O block 326, an LCD controller 328, an interrupt controller 330, and system control 332.

Along with a chip simulation directory, each block simulation directory ("<block>/sim") preferably includes simulation files used in a top simulation environment. The top level chip files typically include all of these block simulation files as part of the system environment. A general summary of the included block level files follows in Table-II.

TABLE II

| File | File Description |
| --- | --- |
| <block>/sim/defs.inc | Includes special block level defines and parameters. |
| <block>/sim/dump.inc | Allows a different waveform dumping configuration to be used for a given block. |
| <block>/sim/libs.inc | Allows conditional linking and compiling of alternate block directories for more flexibility in block simulations. |
| <block>/sim/tasks.inc | Includes any special block level |

TABLE II-continued

| File | File Description |
|---|---|
| | tasks to be included in the top level environment. |

Design compilation and simulation is handled entirely by a "palmsim" script located in a "bin/" directory. Soft links in each of the block simulation directories point to such "palmsim" script so users do not have to modify a PATH variable. The "palmsim" script calls the Verilog-XL simulator executable file to compile all of the necessary files and configure the environment for simulation. The script uses the Verilog-XL "-f" option to read in two Verilog source files: "sim.f" located in the "chip/sim/" directory, and "blk.f" located in the "<block>/sim/" directory.

A "sim.f" file is a primary source file for a top level testbench, and is not intended to be changed by the user. Such file compiles the top level "sim.env" and links in all associated files. The "blk.f" file is a separate file which exists in each block level "<block>/sim/" directory, as well as in the main "syssim/busmodel" simulation sub-directory. Such file supplies the user with a way to add any special Verilog-XL parameters used for simulation, and may include additional "+define+" statements or other Verilog-XL options which the user might need to configure the particular block or system in a certain mode for testing. Use of the "blk.f" allows different designers working on different blocks to configure the simulation environment in multiple ways during block development.

Linking of all the Verilog designs and library components is handled by a "libs.inc" file located in the "chip/sim/" directory. Such file uses the Verilog-XL "uselib" construct to define which directories are to be read to resolve design references. All of the design directories are referenced with these "uselib" statements, so they will all be properly linked in when the chip design is read.

Before running any simulation, the user needs to configure the "palmsim" script to point to the proper version of Verilog-XL to run. Such is done by re-defining the "VERILOG" path variable at the top of the "palmsim" script to give the proper path of the actual Verilog-XL executable. A user can also define a directory where waveform dump files can be placed.

When running gate level simulations, the user needs to set up the environment to point to the proper gate library to simulate with. Such is done by modifying the "chip/sim/libs.inc" to have the "GATE_LIB" variable point to the path of the target foundry gate library.

All simulation files in the design environment preferably exist in a "<block>/sim" directory, or in a "syssim/" sub-directory. These all have the postfix ".sim" and can be run with the "palmsim" script once the environment has been properly configured.

For example, in a simulation, the command, "% palmsim cpumem_axs sst", runs the "cpumem_axs.sim" simulation test with the "+define+sst" flag which turns on waveform data dumping. When the simulation completes, an output log file called "cpumem_axs.log" is generated indicating the results of the simulation.

A simulation environment top level "sim.env" module preferably includes a generically named file called "sim.inc" as the test to simulate. To run different tests, the "palmsim" script creates a soft link whenever it is invoked. The soft link indicates the name of the test specified at the command line and links this to a generically named test file called "sim.inc" which is located in that same directory. When the design is compiled and run, the "sim.env" module then includes this "sim.inc" file which now points to the test the user just specified.

Once a simulation completes, its output log file can be examined by the user to check for any errors. All of the simulation tests provided are self-checking. If any errors occur during the simulation, the testbench will display an error message. The error messages will differ depending on the time of simulation. Bus functional model tests will display a message beginning with "ERROR" if any error or simulation mismatch has occurred. Firmware simulations and bus functional model tests both complete by reporting a "TEST STATUS" message at the end of the log file. If the "TEST STATUS" reports a hex value of 0xCAFECAFE, the test has passed successfully. If any other value is reported, the test did not complete successfully.

A user can configure the simulation environment to output a waveform dump so that the simulation results can be analyzed with a waveform viewer. If waveform dumping is desired, the user can specify a "palmsim" command line argument, e.g., "sst" for SignalScan waveform viewing, "vcd" for Verilog Change Dump (VCD) waveform viewing, and "vpd" for VCDPlus waveform viewing.

Each "<block>/sim/" directory has a local "dump.inc" file which can be modified by the user to customize the amount of dumping or level of scope for the dump file. Such file can also be altered to add in any special Verilog-XL PLI calls for additional waveform viewers not supported by the method above.

System level regressions can be run in one of the main "syssim/" sub-directories. Such directories preferably exist to allow users to group all of the relevant simulations together to run a regression. Usually, the "syssim/" directory has one primary sub-directory called "busmodel/". Such directory includes links to all of the block level bus model tests. A regression script is provided called "regression". Executing this script will run all of the bus model simulations and then generate an output file called "test_summary.all.txt" which indicates the status of all the bus model simulations. Any errors seen in the simulations will be reported here.

Additional sub-directories under "syssim/" are preferably included if a specific processor is targeted and included. The "syssim/" directory will then have another sub-directory which will contain additional simulations that further exercise the system. These simulations run the actual firmware tests that simulate interactions with the processor core itself instead of a bus model. A regression script is also provided in this directory similar to the regression script in the "busmodel/" directory which runs all tests and produces the same "test_summary.all.txt" output file.

Gate level simulations can be run on the design once it has been synthesized successfully into a complete chip Verilog gate level netlist. The design environment is configured to support both RTL and gate simulations through different compile options in the "chip/sim/libs.inc" file.

Two additional simulation scripts are preferably provided to run gate level simulations, e.g., "palmmax" and "palmmin", located in the "bin/" directory. The "palmmax" script runs gate simulations using the "+maxdelays" argument to annotate maximum delays. The "palmmin" script run simulations using the "+mindelays" argument to annotate minimum delays. Otherwise, these two scripts are identical to the "palmsim" script used for behavioral simulation. Examples of running gate level simulations are "% palmmax timerreg"

which runs the "timerreg.sim" simulation using worst-case timings, and "% palmmin dmamem2mem vcd" which runs the "dmamem2mem.sim" file with best case timings and generates an output VCD dump file.

SDF annotation is handled in the "chip/sim/sdf.inc" file. The top level chip synthesis script generates an estimated SDF file based on the Synopsys synthesis results. Such file is then read into the simulator when simulating with SDF annotation enabled.

The design environment preferably includes additional mechanisms for block level modifications and development. These allow the user to simulate a modified version of a block and also block gate level netlists through use of only a single "palmsim" command line option. Such is enabled through the individual block "libs.inc" file, located in "<block>/sim/".

The individual block "libs.inc" files are read in with the top level "chip/sim/libs.inc" file and are used to help select which directories to compile. Such "libs.inc" file includes contain two parameters, "<blk>work" and "<blk>gates". The "<blk>work" option allows a separate "<block>/work/" directory to be compiled instead of the "<block>/vlog/" directory as the source. Such enables the designer to be able to freely make modifications to the block in the separate "<block>/work/" directory, leaving the original working version intact. He/she can then compile the modified code into the entire chip just by specifying the appropriate command line option. In the meantime, other designers can still use the normal stable database without interruption until the designer has tested the modified block and is ready to port the changes in.

Gate level simulation on a block level can also be easily done in this environment through use of the block "libs.inc" file once the block has been synthesized. Using the "<block>gates" command line option, the user can select the source gate level netlist to be run in the normal RTL environment instead of compiling in the RTL behavioral. Such allows the user to work on testing and verifying the synthesis of their block design without having to have the entire chip synthesized.

For example, with the command, "% palmsim dmamem2mem dmawork", the "palmsim" script compiles the RTL environment and uses the "dmamem2mem.sim" test. However, instead of the "dma/vlog/" RTL design source files being read, modules which preferably exist in the "dma/work/" directory are compiled for simulation. Such allows the user to test changes without disrupting the main simulation environment.

For example, with the command, "% palmsim dmamem2mem dmagates", the "palmsim" script compiles the RTL environment as normal and uses the "dmamem2mem.sim" test. Such time, it compiles the block gate level netlist of the DMA block instead of the RTL source code for the DMA block. The RTL source code is compiled for the simulation of the rest of the chip. A user can then verify and debug gate functionality without having to wait for an entire chip netlist to be available, accelerating development time.

In embodiments of the present invention in general, all of the RTL source code is fully synthesizable. Synthesis scripts are preferably provided to allow the user to synthesize the design to a target semiconductor foundry using Synopsys "Design Compiler". These scripts follow a bottom-up synthesis flow. Each functional module has a separate script included with it to synthesize the block to gates. A top chip-level script then links all of the submodules together and performs a top-level synthesis and timing analysis. The final output is a full gate-level netlist of the entire chip which is ready for simulation.

A primary ".synopsys_dc.setup" file is located in the "chip/synop/" directory. All of the block level synthesis directories use a soft link to point to this Synopsys setup file. Such allows only one single setup file to be maintained when modifications are made.

Before synthesis can be run, the ".synopsys_dc.setup" file is modified to suit the user's synthesis environment. E.g., the user updates the ".synopsys_dc.setup" file to point to the appropriate target foundry libraries and their paths which the design will be synthesized to. The library specific constraints are updated in the ".synopsys_dc.setup" file.

All synthesis related files are located in the "synop/" directories for each block. Synthesis files for the UART, for example, are located in the "uart/synop/" directory. In addition, all top level synthesis files as well as the ".synopsys_dc.setup" file are located in the "chip/synop/" directory.

Under each block's "synop/" directory are sub-directories: "synop/out/" includes the output Verilog gate netlist of the design after the scripts are run and the Synopsys ".db" representation of the design; "synop/rpt/" includes the Synopsys reports of the scripts after they are run, including area and timing reports; "synop/scr/" includes the synthesis scripts to read in the modules of the design, set the synthesis constraints, and synthesize and compile the design.

For each block, the main top-level synthesis script uses the block name with the ".scr" postfix. For example, the timer block synthesis script is named "timer.scr", while the UART block's synthesis script is named "uart.scr".

To synthesize a given block, the user needs to change directory to the block's "synop/" directory. The block "synop/" directory includes a link to the main chip ".synopsys_dc.setup" file. Once in the directory, the user can then use Synopsys to run the block's main synthesis script, which is located in the "synop/scr/" directory. Such can be performed using Synopsys "Design Analyzer" or Synopsys "Design Compiler".

To run synthesis, the user types "dc_shell -f scr/<block>.scr". This will run Synopsys Design Compiler, taking input from the block's main synthesis script file in the "scr" directory. For example, the command, "dc_shell -f scr/dma.scr" synthesizes a DMA block and produces a netlist and Synopsys area and timing reports for the DMA block and places the reports in the appropriate directories. A synthesis makefile is also provided to help the user. This runs the same synthesis script to synthesize the block.

Once all of the chip's sub-modules have been synthesized, the top level synthesis scripts can be run. There are two primary scripts to synthesize the chip. The first is "chip_core.scr" located in the "chip_core/synop/scr/" directory. The "chip_core.scr" file reads in all of the netlists of the chip core logic sub-modules and links these together, and then does a top level synthesis to build a netlist of all of the chip core logic.

After the "chip_core" netlist is generated, the top-level "chip.scr" script file can be run. This is located in the "chip/synop/scr/" directory. Such script links the "chip_core" netlist and the netlists of the CPU memory block, the processor core and the interface logic. The script output is a top-level chip netlist in the "chip/synop/out/" directory.

The embodiments of the present invention preferably use a fully synchronous design with only positive-edge triggered flip flops. Such simplifies the design and facilitates static timing analysis and scan insertion.

All of the simulation environment and core logic runs off of a single system clock, allowing the design to be fully synchronous. The test environment is configured to run the main system clock at 100 Mhz. A user can modify the clock speed of the environment by changing the "SYSCLK_PE-RIOD" variable in the "chip/sim/defs.inc" file to a different value. Frequencies up to 100 Mhz are typically supported in the environment.

For gate level simulations, clock tree insertion is not performed. Gate simulations are performed with an ideal clock. The user handles clock tree insertion and post-layout timing and clocking issues.

Figure 4:
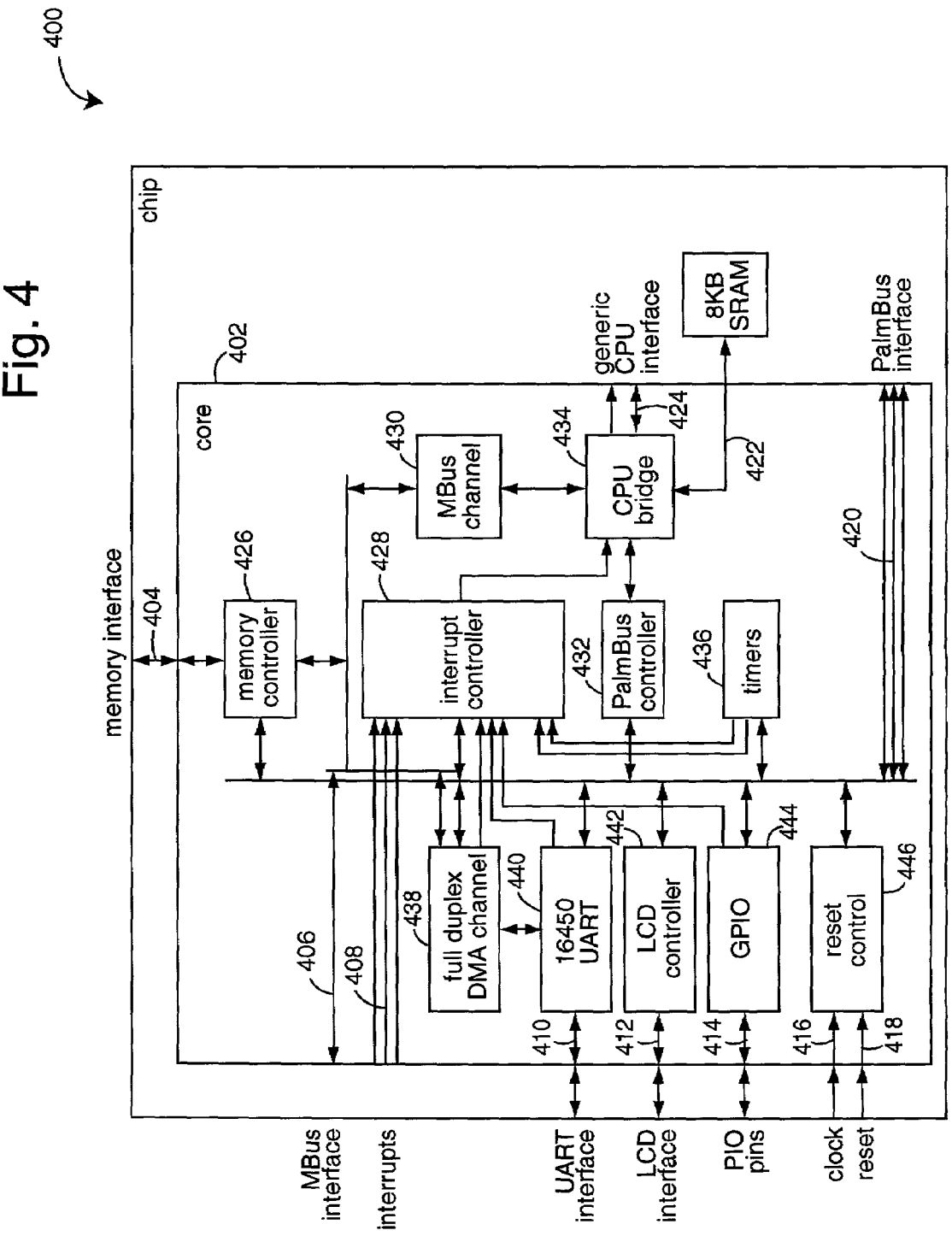
FIG. 4 is a functional block diagram of an embodiment of the present invention that shows the built-in support for extra peripherals of the embodiment.

FIG. 4 illustrates a chip 400 with a core 402 in an embodiment of the present invention, and is similar to that of FIGS. 2 and 3. The core 402 is provided with an MBus interface 406, interrupt signals 408, a UART interface 410, a liquid crystal display (LCD) interface 412, a PIO interface 414, a clock input 416, a reset input 418, a Palmbus interface 420, an SRAM interface 422, and a generic CPU interface 424. A user may integrate a CPU on the chip 400 outside the core 402 and attach it to the generic CPU interface 424. The core 402 delivered to the user predefined and fully verified comprises HDL code on disk or electronically delivered, and includes a memory controller 426, an interrupt controller 428, an MBus channel 430, a Palmbus interface controller 432, a CPU bridge 434, a set of timers 436, a DMA channel 438, a 16450-type UART 440, an LCD controller 442, a general purpose I/O controller 444, and reset control logic 446.

Figure 5:
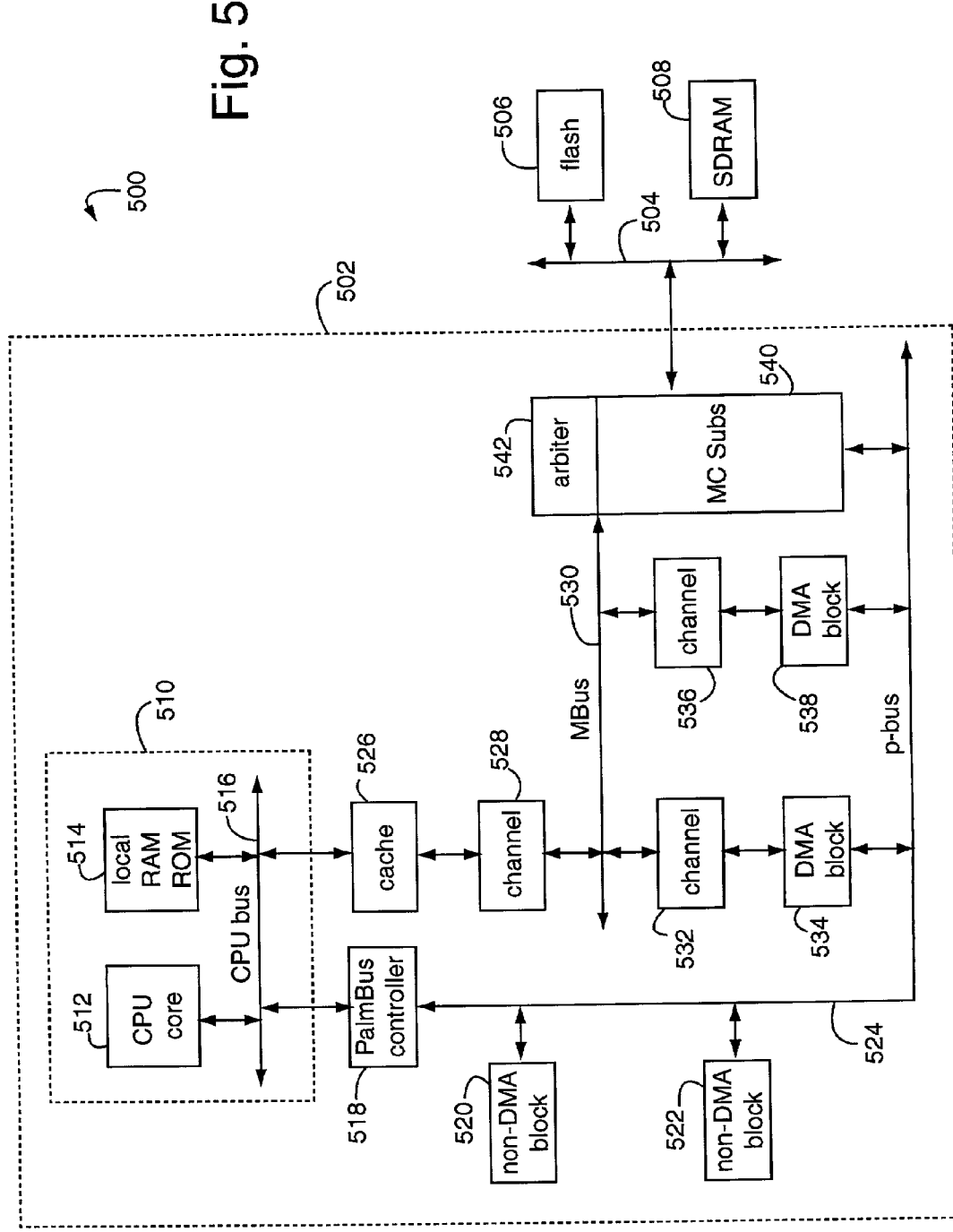
FIG. 5 is a functional block diagram of a generalized embodiment of the present invention.

FIG. 5 illustrates an on-chip interconnect architecture embodiment of the present invention for system-on-chip integration, and is referred to by the general reference numeral 500. The system-on-chip interconnect architecture 500 comprises a single semiconductor chip 502 that may be externally interfaced to a shared memory bus 504 with memory such as a flash memory 506 and SDRAM 508. A CPU subsystem 510 includes a CPU core 512 and local RAM or ROM memory 514. A CPU bus 516 interfaces these to a PalmBus interface controller 518 which hosts several peripheral blocks, including DMA blocks 534 and 538 and non-DMA blocks 520 and 522 connected to a peripheral bus (PalmBus) 524. A cache 526 and channel controller 528 interface the CPU bus 516 to a memory bus (MBus) 530. Another MBus channel controller 532 interfaces to a DMA block 534. Other such DMA interfaces between the MBus 530 and PalmBus 524 are represented by a channel controller 536 and a DMA block 538. A Memory Controller (MC) Subsystem 540 connects the shared memory bus 504 to the internal MBus 530 with the aid of a bus arbiter 542.

The system-on-chip interconnect architecture 500 preferably enables electronics applications to be developed quickly and to be portable between silicon foundries. Embodiments of architecture 500 must be easily synthesizable, centered around shared memory, flexible, modular, not sacrifice performance over alternative approaches, and must not add to embodiment cost. Therefore, embodiments of architecture 500 are constructed, in general, with unidirectional buses only, central shared memory controllers, separate interconnects for high-speed and low-speed peripherals, zero wait-state register accesses, application-specific memory map and peripherals, application-specific test methodology, allowances for cache controllers, and good fits with standard ASIC flow and tools.

The system-on-chip interconnect architecture 500 separates I/O control, data DMA and CPU onto separate buses to avoid bottlenecks. Architecture 500 includes the use of bus speeds that are scalable to technology and embodiment requirements. It supports 32-bit, 16-bit and 8-bit peripherals, it separates peripheral input/output (I/O) and direct memory access (DMA) interconnects, it uses simple protocols for reduced gate counts, uses positive-edge clocking only, uses no tri-state signals or bus holders, keeps itself to low capacitive loading for high performance operation, does single clock cycle data transfers, uses hidden arbitration for DMA bus masters so no additional clock cycles are needed for the arbitration, includes DMA channels with buffers (FIFOs) for addressing memory, does not need its peripherals to integrate FIFOs to interface to a DMA channel, has a channel structure that reduces latency while enhancing reusability and portability, has channels with closer ties to the memory controller through the MBus, and includes on-chip memory for exclusive use by the processor via the processor's native bus.

The PalmBus 524 provides for low-speed accesses to peripherals, while the MBus 530 allows for high-speed accesses to shared memory from the CPU core 512 and peripherals. The PalmBus 524 is the communications interface between the CPU and its peripherals, and is not used to access memory. The PalmBus 524 is a master-slave interface with the CPU core 512 connected through an interface controller 518 as its single master. Its signal timing is typically synchronous with the CPU core 512 but can run at a different frequency. The MC subsystem 540, arbiter 542 and channels (e.g., 532, 536) may also be tied to the PalmBus 524 for configuration, control and status.

The MBus 530 is the communications interface between the MC subsystem 540 and the DMA channels (e.g., 532, 536). The MBus 530 is preferably an arbitrated initiator-target interface with only one target, the MC subsystem 540. Each initiator, or master, arbitrates for command of the MC subsystem 540. Once a transfer is granted, the MC subsystem 540 becomes the bus master and thereafter controls all the data flow. The MBus 530 is synchronous to the MC subsystem 540 and can facilitate peer-to-peer communications. But it is optimally used for peripheral-to-memory and memory-to-peripheral communications.

The CPU core 512 may be provided by a silicon foundry as a hardcore (e.g., ARM7, ARM9, MIPS, PowerPC, etc.) or by a core vendor as a soft core (e.g. ARM7TDMI-S, Lexra or ARC). The interface specifications for such must be provided. The preferred clock rate applied to the CPU core 512 depends on the PalmBus 524 clock rate. It may be a divide-by-two of the PalmBus 524 clock signal when the processor cannot be run at full system speed, or in order to guarantee a clock with a fifty percent duty cycle to the CPU. The CPU core clock can also be run at the same speed as the system to make everything fully synchronous and for performance or at a higher speed if the processor is capable, includes cache memory and requires the additional performance.

All internal memory that is used exclusively by the processor is connected directly to the CPU core 512 on its native buses. Address latching may be required. If no wait states are needed, then interface logic is minimal. The interface controller 518 generates a clock signal for the CPU and provides timing translation, blocks' 520, 522, 534 and 538 address decode, and wait generation. The channel controllers 532 and 536 interface between any DMA peripherals and the MBus 530. A peripheral block 534 or 538 interfaces to a channel only if it accesses shared memory. If a peripheral block 534 or 538 is asynchronous to the MC subsystem 540, a buffer (FIFO) is implemented where the block's 534 or 538 side of the buffer is synchronous to the block's 534 or 538 clock signal. The MC subsystem 540 side of the buffer is made synchronous to the MC subsystem 540. The MC subsystem 540 is preferably a target of the MBus 530, and controls accesses to shared memory. Such includes all timing and protocol controls. Its interface to the arbiter 542 may be direct or through the MBus 530, or with connections to both.

The arbiter 542 is generally application specific. It takes requests from each of the channels and responds with a grant when an access can be accommodated. It may be directly integrated in the MC subsystem 540.

In general, each of the blocks 520, 522, 534 and 538 is preferably attached to the PalmBus 524. Blocks that are generally needed in processor-based systems but which are not part of the CPU core 512 are attached to the PalmBus 524. Examples of such blocks are timers, interrupt controllers and UARTs. If a peripheral block 534 and 538 performs DMA accesses to shared memory, it includes a PalmBus 524 interface and a channel controller 532 and 536 to the MBus 530.

An embodiment hardware development kit (PALM-CF2000) marketed by Palmchip Corporation (San Jose, Calif.) includes the peripheral components required for an ARM7TDMI system-on-chip embodiment. It includes a PalmBus controller, MBus bridge, DMA channel interfaces, system timer, watchdog timer, interrupt controller and memory controller. Such kit also includes a UART that may be used for software debug and system monitoring. New peripherals can be added and pre-existing functions ported to the PalmBus and MBus. Variations on the interface controller 518 and cache 526 can be made to support other CPU cores. For more information, see Palmchip's products web page at http://www.palmchip.com.

Although the present invention has been described in terms of the presently preferred embodiments, it is to be understood that this disclosure is not interpreted as limiting. Various alterations and modifications will no doubt become apparent to those skilled in the art after having read the above disclosure. Accordingly, it is intended that all appended claims be interpreted as covering all alterations and modifications as falling within the true spirit and scope of the invention.

What is claimed is:

1. A system-on-chip design integration platform, comprising:
a pre-defined system-on-chip (SoC) architecture that includes synthesized and verified semiconductor intellectual property (SIP) hardware description language (HDL) versions of at least an integrated central processing unit (CPU) provided as a softcore or a hard core, a shared memory controller, a peripheral controller, a set of system peripherals, a DMA controller, an embedded memory, and general system control;
a first CPU bridge that converts specific CPU interface signals from a specific CPU to a standardized CPU interface;
a second CPU bridge that converts said standardized CPU interface to provide said specific CPU access to said shared memory controller, said peripheral controller, said set of system peripherals, said DMA controller, said embedded memory, and said general system control;
wherein said first and said second CPU bridges provide said standardized CPU interface so that said specific CPU can be chosen from a variety of CPUs with incompatible signals;
and a mechanism for incorporating a user-defined SIP HDL device on a common semiconductor chip.

2. The claim according to claim 1 further comprising a design environment providing for SIP development and verification.

3. The claim according to claim 1 further comprising a computer data file in which the pre-defined SoC architecture is deliverable to a user for use in semiconductor integrated circuit design.

4. The claim according to claim 1 further comprising a computer data file in which the pre-defined SoC architecture is deliverable for a fee over the Internet to a user for their use in a semiconductor integrated circuit design.

5. A method to make a system-on-chip design integration platform, comprising:
providing a pre-defined system-on-chip (SoC) architecture that includes synthesized and verified semiconductor intellectual property (SIP) hardware description language (HDL) versions of at least an integrated central processing unit (CPU) provided as a softcore or a hardcore, a shared memory controller, a peripheral controller, a set of system peripherals, a DMA controller, an embedded memory, and general system control;
providing a first CPU bridge that converts specific CPU interface signals from a specific CPU to a standardized CPU interface;
providing a second CPU bridge that converts said standardized CPU interface to provide said specific CPU access to said shared memory controller, said peripheral controller, said set of system peripherals, said DMA controller, said embedded memory, and said general system control;
wherein said first and said second CPU bridges provide said standardized CPU interface so that said specific CPU can be chosen from a variety of CPUs with incompatible signals; and
providing a mechanism for incorporating a user-defined SIP HDL device on a common semiconductor chip.

6. The claim according to claim 5 further comprising a design environment providing for SIP development and verification.

7. The claim according to claim 5 further comprising a computer data file in which the pre-defined SoC architecture is deliverable to a user for use in semiconductor integrated circuit design.

8. The claim according to claim 5 further comprising a computer data file in which the pre-defined SoC architecture is deliverable for a fee over the Internet to a user for their use in a semiconductor integrated circuit design.

9. A method to use a system-on-chip design integration platform, comprising:
using a pre-defined system-on-chip (SoC) architecture that includes synthesized and verified semiconductor intellectual property (SIP) hardware description language (HDL) versions of at least an integrated central processing unit (CPU) provided as a softcore or a hard core, a shared memory controller, a peripheral controller, a set of system peripherals, a DMA controller, an embedded memory, and general system control;
providing a first CPU bridge that converts specific CPU interface signals from a specific CPU to a standardized CPU interface;
providing a second CPU bridge that converts said standardized CPU interface to provide said specific CPU access to said shared memory controller, said peripheral controller, said set of system peripherals, said DMA controller, said embedded memory, and said general system control;

wherein said first and said second CPU bridges provide said standardized CPU interface so that said specific CPU can be chosen from a variety of CPUs with incompatible signals; and incorporating a user-defined SIP HDL device on a common semiconductor chip.

10. The claim according to claim 9 further comprising a design environment providing for SIP development and verification.

11. The claim according to claim 9 further comprising a computer data file in which the pre-defined SoC architecture is deliverable to a user for use in semiconductor integrated circuit design.

12. The claim according to claim 9 further comprising a computer data file in which the pre-defined SoC architecture is deliverable for a fee over the Internet to a user for their use in a semiconductor integrated circuit design.

13. A computer software product readable by a computer that tangibly embodies a program of instructions executable by the computer to perform a method to use a system-on-chip design integration platform, comprising:

using a pre-defined system-on-chip (SoC) architecture that includes synthesized and verified semiconductor intellectual property (SIP) hardware description language (HDL) versions of at least an integrated central processing unit (CPU) provided as a softcore or a hard core, a shared memory controller, a peripheral controller, a set of system peripherals, a DMA controller, an embedded memory, and general system control;

providing a first CPU bridge that converts specific CPU interface signals from a specific CPU to a standardized CPU interface;

providing a second CPU bridge that converts said standardized CPU interface to provide said specific CPU access to said shared memory controller, said peripheral controller, said set of system peripherals, said DMA controller, said embedded memory, and said general system control;

wherein said first and said second CPU bridges provide said standardized CPU interface so that said specific CPU can be chosen from a variety of CPUs with incompatible signals; and incorporating a user-defined SIP HDL device on a common semiconductor chip.

14. The claim according to claim 13 further comprising a design environment providing for SIP development and verification.

15. The claim according to claim 13 further comprising a computer data file in which the pre-defined SoC architecture is deliverable to a user for use in semiconductor integrated circuit design.

16. The claim according to claim 13 further comprising a computer data file in which the pre-defined SoC architecture is deliverable for a fee over the Internet to a user for their use in a semiconductor integrated circuit design.

* * * * *